Feb. 4, 1930. F. S. CARR Re. 17,581

SEPARABLE FASTENER

Original Filed Dec. 20, 1924

Fred S. Carr Deceased
United Carr Fastener Corporation
Assignee of Fred S. Carr by Emery, Booth, Varney & Townsend
Attys Reissued Feb. 4, 1930

Re. 17,581

UNITED STATES PATENT OFFICE

FRED S. CARR, DECEASED, LATE OF NEWTON, MASSACHUSETTS, BY UNITED-CARR FASTENER CORPORATION, OF CAMBRIDGE, MASSACHUSETTS, A CORPORATION OF MASSACHUSETTS, ASSIGNEE

SEPARABLE FASTENER

Original No. 1,685,062, dated September 18, 1928, Serial No. 757,161, filed December 20, 1924. Application for reissue filed November 9, 1929. Serial No. 406,123.

This invention aims to provide an improved separable fastener.

In the drawings, which illustrate a preferred embodiment of the invention:—

Figure 1:
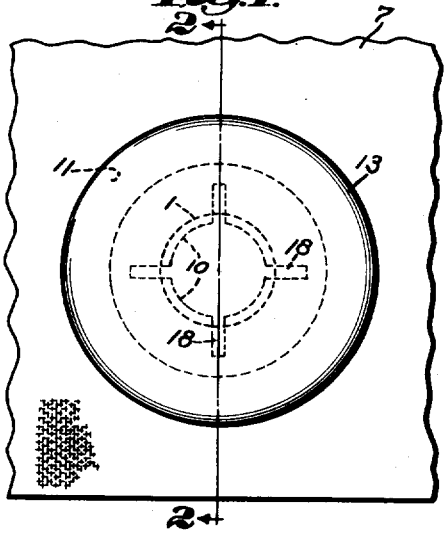
Figure 1 is a front elevation of the fastener.
Figure 2:
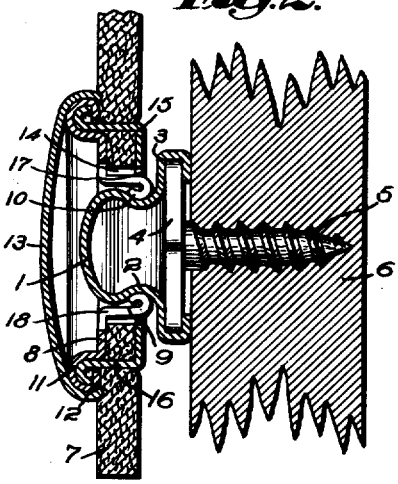
Fig. 2 is a section on the line 2—2 of Fig. 1, being partly in elevation.
Figure 3:
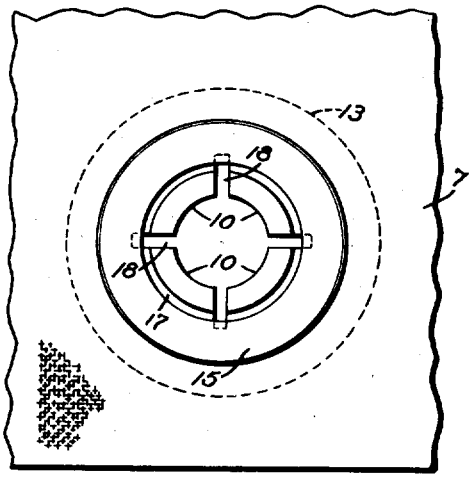
Fig. 3 is a rear elevation of the socket attached to a flexible support.

Referring to the drawings, there is shown a separable fastener which is particularly useful as a curtain fastener or as a glove fastener, although it may be used for many other purposes where a snap fastener is required. The stud illustrated is of the well known hollow pressed type, having a head 1, a neck 2 and a base portion 3. The base portion is crimped over the head 4 of an attaching screw 5, which is secured to a rigid support 6, such as the body of an automobile, as shown in Fig. 2.

The socket is secured to the curtain 7 and includes a stud-engaging part having a base portion 8 and a tubular portion pressed from the center of the base portion and slit throughout its entire length and partly into the base portion 8 to provide a plurality of resilient fingers 9. These fingers are provided at their free ends with reversely bent neck-engaging portions 10 preferably bent inwardly to engage the neck of the stud. The resilient fingers are substantially parallel with the axis of the stud and are free to expand to a limited extent, as more fully hereinafter described. The base portion 8 of the stud-engaging part also presents at its outer periphery a prong-receiving portion, which comprises an anvil portion 11 and a clench portion 12, to which is secured a cap member 13 (Fig. 2) for concealing the underlying portions of the socket. This cap may or may not be used, but it is preferred to use it so as to provide a neat and finished appearance to the socket when viewed from the outer face of the curtain 7.

While the socket may be secured to the curtain 7 in any suitable manner, it is preferred to secure it thereto so that the base portion 8, of the stud-engaging part, will overlie a portion of the outer face of the curtain 7.

Figure 5:
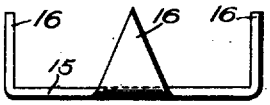
Fig. 5 is a side elevation of the back plate.

The resilient fingers 9 pass through an aperture 14 in the curtain 7 and extend slightly beyond the inner face of the curtain 7. A back plate 15 is applied to the inner face of the curtain and is secured to the stud-engaging part by a plurality of attaching prongs 16. These prongs project from the periphery of the back plate (Fig. 5) and extend through the curtain 7 where they are bent outwardly and downwardly by the anvil portion 11 against the clench portion 12, thus securing all the parts of the socket to the curtain. The back plate also presents an aperture 17 through which the resilient fingers 9 protrude, and which is large enough in diameter to permit the resilient fingers to expand during engagement and disengagement with the stud. The wall, surrounding the aperture, back supports the resilient fingers and prevents too great expansion thereof, when strain is exerted thereon. Thus the resilient fingers are back supported by the back plate 15 so that the fastener cannot be separated by resolution of forces due to lateral strain exerted upon the curtain 7.

Figure 4:
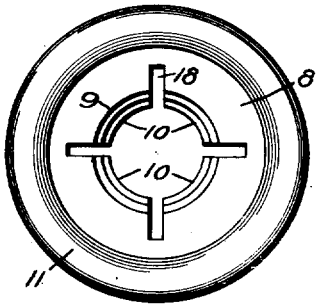
Fig. 4 is an elevation view of the socket before it is secured to its support and with the cap removed.

The slots 18 between the fingers 9 extend into base portion 8 (Fig. 4) sufficient distance to permit the fingers to bend upon straight lines, passing through the flat base portion 8 between the slots 18, during contraction and expansion thereof. By extending the slots to the base 8, the fingers 9 may bend more easily with less possibility of their becoming set because they do not bend upon the curved portion as would be the case if the slots terminated at or before reaching the base portion. Thus there is provided a socket which is strong and durable and which is simple and inexpensive to manufacture.

While there is shown and described a preferred embodiment of the invention, it will be understood that changes involving omission, substitution, alteration and reversal of parts, and even changes in the mode of operation, may be made without departing from the scope of the invention, which is best defined in the appended claims.

Claims:

1. A fastener socket installation comprising, in combination, a carrying medium, a stud-receiving part having a flange seated against the outer face of the carrying medium, a tubular portion extending from said flange through an aperture in said carrying medium and turning and clenching means formed integral with said flange, said turning and clenching means being presented at said outer face of the carrying medium, and means presenting a plurality of attaching prongs, said means seated on the inner face of the carrying medium, said prongs piercing the carrying medium and engaging the turning and clenching means to secure said stud-receiving part in position.

2. A fastener socket installation comprising, in combination, a carrying medium, a stud-receiving part having a flange seated against the outer face of the carrying medium, a tubular portion extending from said flange through an aperture in said carrying medium, prong turning and clenching means formed integral with the flange of said stud-receiving part, and an attaching plate at the inner face of the carrying medium presenting a plurality of attaching prongs adjacent to its outer periphery for piercing the carrying medium and engaging the turning and clenching means to secure the stud-receiving part to the carrying medium.

3. A fastener socket comprising a stud-receiving part presenting a combined base portion and a prong-receiving and clenching portion formed from the same piece of metal and located at the outer face of a flexible support, a back plate located at the inner face of the support and presenting an aperture therethrough and a plurality of prongs extending from said back plate, said prongs piercing the support and clenched into engagement with the prong-receiving portion and a plurality of contractible and expansible stud-engaging portions extending from said base portion through an aperture in the support and the aperture in the back plate and said stud-engaging portions limited in their expansive movement by the wall surrounding said aperture in said back plate.

4. A fastener socket installation comprising a carrying medium, a one piece stud-receiving part presenting a base portion and a prong-receiving and clenching portion located at the outer face of the carrying medium, a back plate located at the inner face of the support and presenting an aperture therethrough, a plurality of prongs presented at the outer periphery of said back plate, said prongs piercing the support and clenched by the prong-receiving portion and a plurality of contractible and expansible stud-engaging portions extending from said base portion through the support and the aperture in the back plate, said portions being limited in their expansive movement by said back plate, and a cover plate secured to said stud-engaging part to conceal it from view at the outer face of the support.

5. A fastener socket installation comprising, in combination, a carrying medium, a stud-receiving part having a base located at the outer face of said carrying medium, a tubular portion pressed from the material within the periphery of said base said tubular portion being open at both ends and extending through an aperture in said carrying medium, turning and clenching means formed integral with said base and located at the outer face of the carrying medium, and a plate located at the inner face of said carrying medium, and attaching means extending from said plate through the carrying medium and engaging the turning and clenching means to secure said stud-receiving part in position relative to the carrying medium and a separate cap member secured to the base of said stud-receiving part to conceal the same from view at the front side of the carrying medium.

6. A fastener socket installation comprising, in combination, a stud-receiving part having a centrally depressed portion providing a boss split to provide a number of resilient fingers surrounding a stud-receiving aperture, a substantially U-shaped ring-like attaching portion adjacent to the periphery of said stud-receiving part, a socket-carrying support having an aperture therethrough, said stud-receiving part having its boss extending into the aperture in the support and the ring-like portion resting against one face of the support and an attaching element having a portion resting against the opposite face of the support and having means extending therefrom through the support and bent outwardly into the hollow of the U-shaped ring-like attaching portion to hold the installation assembled and a separate cap member secured to the base of said stud-receiving part to conceal the same from view at the front side of the carrying medium.

7. A fastener socket installation comprising, in combination, a carrying medium, a stud-receiving part having a base of single thickness located at the outer face of said carrying medium, a tubular portion pressed from said base and extending through an aperture in said carrying medium, turning and clenching means formed integral with said base of a single thickness of metal and located at the outer face of the carrying medium, and a plate located at the inner face of said carrying medium and attaching means extending from said plate through the carrying medium and engaging the turning and clenching means to secure said stud-receiving part in position relative to the carrying medium and a separate cap secured to the base of said stud-receiving part to conceal the same from view at the front side of the carrying medium.

UNITED-CARR FASTENER CORPORATION,
*Assignee of Fred S. Carr, Deceased,*
By PRESTON UPHAM,
*Vice-President.*